United States Patent [19]

Chapman

[11] 4,299,481

[45] Nov. 10, 1981

[54] ADJUSTABLE CURRENT LAMPHOUSE

[75] Inventor: Darwin E. Chapman, Mountain View, Calif.

[73] Assignee: Ciba-Geigy AG, Basel, Switzerland

[21] Appl. No.: 26,121

[22] Filed: Apr. 2, 1979

[30] Foreign Application Priority Data

Mar. 31, 1978 [GB] United Kingdom ............... 12629/78

[51] Int. Cl.³ ............................................. G03B 27/72
[52] U.S. Cl. ....................................... 355/69; 355/70
[58] Field of Search .................................. 355/67–71, 355/83

[56] References Cited

U.S. PATENT DOCUMENTS

| 3,694,074 | 9/1972 | Huboi et al. | 355/38 |
| 3,887,279 | 6/1975 | Rubin | 355/38 |
| 4,124,292 | 11/1978 | Van Wandelen | 355/70 X |
| 4,136,945 | 1/1979 | Stephens | 355/14 |

FOREIGN PATENT DOCUMENTS

| 1539468 | 1/1979 | United Kingdom | 355/70 |
| 2017946 | 10/1979 | United Kingdom | 355/70 |

Primary Examiner—L. T. Hix
Assistant Examiner—W. J. Brady
Attorney, Agent, or Firm—Harry Falber

[57] ABSTRACT

The lamphouse is used for the production of prints on variable control paper and comprises a first tungsten filament lamp from which light passes through a color selective filter which passes light in one of two mutually exclusive wavebands. A second filament lamp and filter passes light in the other of the two mutually exclusive wavebands. A diffusing screen is placed to pass the filtered light out of the lamphouse and through a transparency which is to be printed.

Between each lamp and an alternating voltage source is connected a bidirectional thyristor, whose phase angle of conduction is determined by a microprocessor according to data stored in a read-only memory and by single manual controls for the selecting alternative addresses in the memory according to the contrast of print to be made. The data stored in the memory is chosen to cause the bidirectional thyristors to adjust the currents through the two lamps so that the energies of the light in the two mutually exclusive wavebands vary in a complementary manner as the chosen contrast of print is varied.

2 Claims, 2 Drawing Figures

ADJUSTABLE CURRENT LAMPHOUSE

This invention relates particularly to the production of prints on variable-contrast photographic printing material, usually printing paper.

Variable-contrast printing papers have been known for many years and are based on the use of photographic emulsion, or a combination or mixture of emulsions, which react differently to coloured printing light in the sense of yielding from a standard negative original prints of varying contrast according to the colour of the printing light used.

Thus for example as described in British Pat. No. 494,088 one such material comprises two gelatino silver halide emulsions, one of which is designed to afford images of high contrast while the other is designed to afford images of low contrast. The emulsions are arranged to be sensitive to light in different regions of the spectrum, for example the low-contrast emulsion may be blue-sensitive and the high-contrast emulsion may be sensitised to the green and/or red regions of the spectrum. It then arises that accordingly as the colour of the exposing light varies, more of one and less of the other emulsion will be effectively exposed and the net contrast of the developed prints will correspondingly vary.

In other material as described in British Pat. No. 547,883 all the emulsion components are of the same basic contrast but the individual components have been dye-sensitised in varying degree to green light. Such material which at the present moment is of most interest may also be used as variable contrast photographic printing paper.

The usual technique employed in the production of prints on such a material is to provide a set of colour filters of different colour transmission characteristics, whereby the colour of printing light may be adjusted.

By the appropriate selection of the filter used to control the colour of the printing light, it then arises that negatives representing a wide range of contrasts can be printed on the one type of printing paper, each yielding a print of the desired contrast.

However, the system as operated at present suffers from some disadvantages. Thus, when it is desired to make a change in the effective contrast of the paper by changing filters it also becomes necessary to modify the exposure given to the print. Since the required change in exposure varies with the degree of alteration that is being made in the contrast of a print, it is often necessary to expose several test strips before the final print can be made with assurance of a satisfactory result. Further, for convenience in operation, the contrast changing filters are often placed in the printing beam below the enlarger lens, thereby impairing to some extent the quality of the projected image. (An alternative position for the filters is above the condenser, in the enlarger head, but this gives rise to considerable inconvenience in practice).

A photographic system which may also be used to produce prints of variable contrast consists of conventional photographic printing material of fixed contrast, preferably medium contrast, and a transparency the image of which comprises a dye the optical absorption of which is selective within the wavelength band to which the printing material is sensitive. Thus, for example, the transparency may comprise an image in varying densities of a yellow dye which absorbs violet light heavily, but transmitting green light relatively freely. If a print be made from such a transparency using only violet light, a print of high contrast will be produced. If the print be made using blue light, a print of lower contrast will result. Intermediate contrasts will result from the use of appropriate mixtures of violet and blue light.

In British Pat. No. 1,539,468 there was described an enlarger head for printing on to variable contrast paper using a black and white transparency or on to conventional photographic print material using a monochrome transparency by use of which the optimum time remains unchanged throughout the whole of the available contrast range of the print material.

In British Pat. No. 1,539,468 the enlarger head comprised a lamphouse which comprises at least one tungsten filament lamp from which light passes through a first colour-selective filter passing light in one of two mutually exclusive wavebands and at least one tungsten filament lamp from which light passes through a second colour-selective filter passing light in the other of the two mutually exclusive wavebands, a diffusing screen placed to pass the filtered light out of the lamphouse and through the transparency, there being connected to the lamphouse electrical means actuated by a single manual control to adjust the currents in the lamp filaments so that the actinic intensities of light passing said first and second colour filters are adjusted in complementary manner.

We have now discovered an improved lamphouse of this type, in which a single manual control is used both to adjust the currents in the lamp filaments to obtain the desired contrast and to control the overall light intensity so that the desired exposure is not changed by altering the contrast setting.

Therefore according to the present invention there is provided a lamphouse for use in the production of prints on variable contrast material, the lamphouse comprising at least a first tungsten filament lamp from which light passes through a first colour-selective filter passing light in one of two mutually exclusive wavebands and at least a second tungsten filament lamp from which light passes through a second colour-selective filter passing light in the other of the two mutually exculsive wavebands, a diffusing screen placed to pass the filtered light out of the lamphouse and through a transparency which is to be printed there being connected between each said lamp and an alternating voltage source a bidirectional thyristor (triac), the phase angle of conduction of which is determined by a microprocessor according to data stored in a read-only memory, and single manual control means for selecting alternative addresses in the memory according to the contrast of print to be made, the data stored being chosen to cause the bidirectional thyristors to adjust the currents through said first and second lamps so that the energies of light in the two mutually exclusive wavebands vary substantially in inverse proportion as the chosen contrast of print is varied and the total light intensity is controlled to suit the sensitivity of the material at different contrast grades to ensure equal exposure for each contrast grade.

Preferably the microprocessor is used to determine the phase angle of conduction by counting internally generated pulses as determined by the data in the read-only memory (ROM) starting at a time related to the instant when the mains voltage becomes zero, and on completion of the count energising one or more of the microprocessor output terminals so as to cause the triac to be brought into conduction.

The single manual control may comprise a plurality of single-pole rotary switches mounted in tandem on a single shaft and controlled by a single knob. In such a control, the single manual operation comprises turning the single knob to a predetermined position of the switch, corresponding to the ratio of, for example, blue-light to green-light exposures to be given to the print material hence corresponding also to a predetermined effective contrast of the print material.

For this purpose of this invention, the "single manual control" also includes any suitable form of touch-sensitive or pushbutton selector switch assembly whereby a single manual operation determines the intensities at which the two lamps are to operate.

In the lamphouse of this invention the electrical means associated with said single manual control comprises two triacs and the conduction angle of each triac is stored as data in one of several locations in a read-only memory (ROM) contained within the microprocessor. The control instructions of the microprocessor are used to interpret the operation of the said single manual control and to select the appropriate location in the said ROM.

A large proportion of the variable contrast material at the present on the market comprises at least two emulsions, one of which is sensitive to blue light and the other of which is additionally sensitive to green light. Thus in one embodiment of the invention the first colour selective filter is yellow and the second colour selective filter is magenta. Both filters transmit red light, to which the paper is not sensitive. The operator may find the addition of red light useful in composing, focusing, dodging and shading the print on the enlarger easel.

In one embodiment of the invention in the lamphouse there are only two tungsten filament lamps, one being associated with each colour selective filter. Most preferably each tungsten filament lamp is a tungsten halogen lamp. Also in another larger embodiment of the lamphouse of the present invention there are two pairs of tungsten filament lamps, a pair being associated with each colour selective filter.

Preferably the diffusing means in the lamphouse is composed of white expanded polystyrene. Preferably the diffuser screen above the transparency is an opalescent diffuser such as opal or ground glass.

By conventional photographic print material is meant photographic print material which when imagewise exposed via a photographic transparency and processed under normal conditions yields a print of a fixed contrast. The lamphouse of the present invention may also be used in the production of prints using conventional print material.

According to another aspect of the present invention there is provided a method of producing prints on variable contrast photographic printing material of predetermined speed and contrast characteristics by use of the lamphouse of the present invention as hereinbefore defined which is located in an enlarger above a transparency, which lamphouse comprises means for producing from a first light source and from a second light source light in at least two mutually exclusive wavelength bands, to which the printing material has been selectively sensitised, and a single manual control which increases the light intensity from one of said source and at the same time reduces the light intensity from the other said source in complementary manner so that when the enlarger has been adjusted to produce a correctly exposed print from the transparency, correctly exposed prints of alternative contrast can be obtained using the same exposure time by alteration only of the said single manual control.

According to a further feature of the invention, there is provided a method of producing prints of variable contrast on photographic printing material of predetermined speed and contrast characteristics from a monochrome transparency by use of the lamphouse of the present invention as hereinbefore defined which is located in an enlarger above said transparency, which lamphouse comprises means for producing from a first light source in a wavelength band corresponding to major selective absorption by said monochrome transparency and means for producing from a second light source light in a wavelength band corresponding to a lower degree of absorption by said transparency, the printing material being sensitive to light in both said bands, and a single manual control which increases the light intensity from one of said sources and at the same time reduces the light intensity from the other said source in complementary manner so that when the enlarger has been adjusted to produce a correctly exposed print from the transparency, correctly exposed prints of alternative contrast can be obtained using the same exposure time by alteration only of the said single manual control.

The lamphouse of the present invention can also be used in a contact printing process.

The accompanying drawings will serve to illustrate the lamphouse of the present invention and how it is employed in the methods of the present invention.

Figure 1:
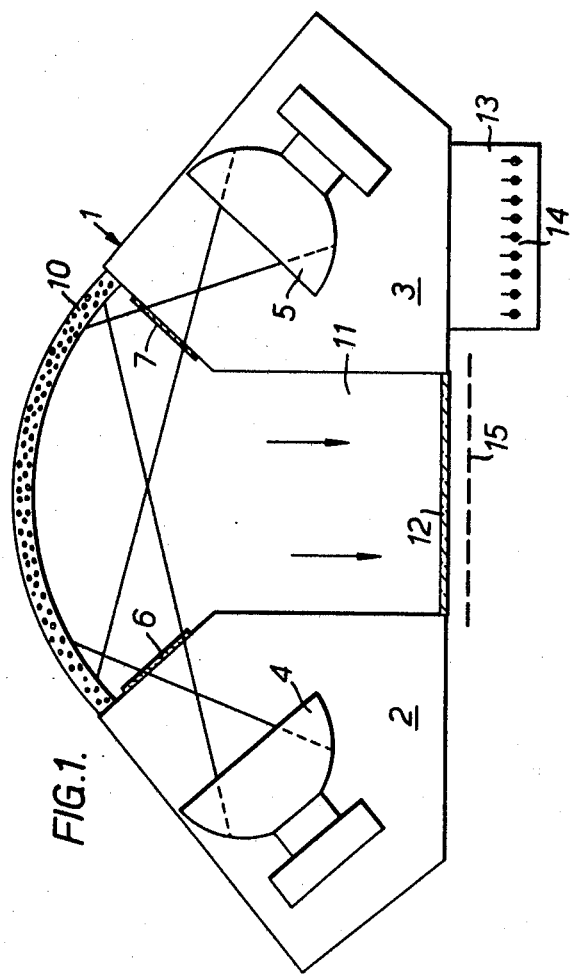
FIG. 1 is a diagrammatic cross-sectional front elevation of a lamphouse according to the present invention.

In FIG. 1 a lamphouse body 1 encloses two compartments 2 and 3 each holding a 75 watt tungsten halogen lamp 4 and 5. Placed at the outlet of compartment 2 above the lamp 4 is a yellow filter 6. Placed at the outlet of compartment 3 is a magenta filter 7. Covering the inside of the curved top of the body 1 of the lamphouse is an expanded white polystyrene diffuser 10. Below the diffuser 10 is a polished metal mirror tunnel 11. At the base of the mirror tunnel 11 is an opal diffuser screen 12. The position of the transparency 15 located in the enlarger below the lamphouse is indicated. Below compartment 3 is located the electrical means in a compartment 13 for causing the light intensities of one of lamps 4 and 5 to be increased and the other of lamps 4 and 5 to be decreased in complementary manner. This is effected by depressing the requisite switch on the bank of switches 14, each switch being labelled with an arbitrary contrast number.

Figure 2:
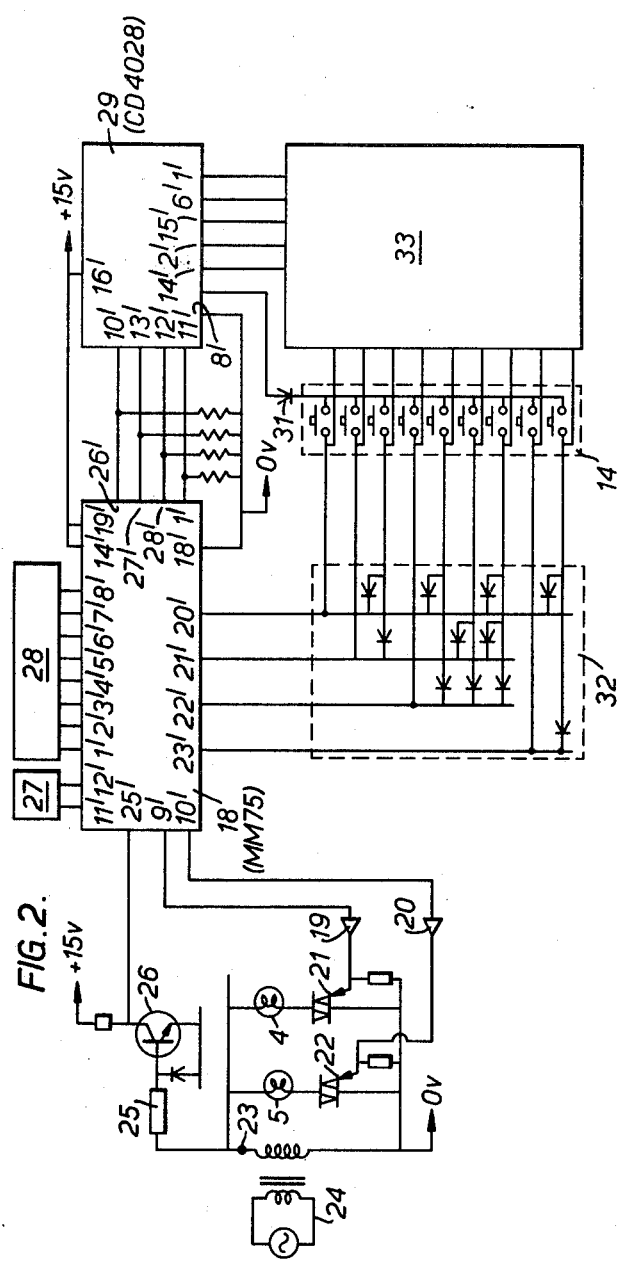
FIG. 2 illustrates an electrical circuit employed in the lamphouse of the present invention by means of which complementary control of the two light intensities may be obtained from a single manual control which is a bank of switches.

In FIG. 2 the pin numbers on individual devices are shown with a prime.

In FIG. 2 is shown a microprocessor 18, type number MM75 manufactured by Rockwell International Corporation, whose pins 9' and 10' are connected to two amplifiers 19 and 20 which in turn are connected to the triacs 21 and 22. The triacs are connected to the lamps 4 and 5 which are connected to the secondary winding 23 of a transformer 24 whose primary winding is energised by the alternating current mains supply and the other end of said primary is connected to the system zero voltage point.

Secondary winding 23 is also shown connected via a resistor 25 to the base of a transsistor 26, whose collector is connected to pin 25' of the microprocessor 18. The microprocessor is also shown connected by its pins 11' and 12' to output devices 27 and by pins 1', 2', 3', 4', 5', 6', 7', 8' to display devices 28. Pins 26', 27', 28', 29' are connected by individual resistors to the system zero voltage point and to pins 13', 12', 11' and 10' on the device 29 which is of type CD 4028 as manufactured for example by R.C.A. Pin 8' of device 29 is connected via a diode 31 to a bank of nine switches 14 which comprise the single manual means for selecting the appropriate contrast grade. The switches 14 are mechanically interlocked so that only one switch may be closed at any one time. The bank of switches 14 are also connected via a matrix of diodes 32 to pins 20', 21', 22', 23' of microprocessor 18. Connected to pins 1', 2', 6', 14', 15' of device 29 are wires connected to 33 which is a data entry unit consisting of switches connecting to the microproccesor 18 through the diode matrix 32.

Device 29 is a binary to decimal converter and in response to the activation of pins 10', 11', 12', 13' one only of the output lines is raised to a high potential relative to system zero voltage. The microprocessor interrogates the switch bank by raising the output pin 7' of device 29 which in turn causes a binary representation of the switch contact closed to be presented to the microprocessor pins 20', 21', 22', 23'. This data is then used to set the time delays from the start of the main cycle required for the correct intensities from lamps 4 and 5.

The voltage at the collector of transistor 26 is a square wave whose transitions correspond to the instants at which the lamp supply voltage from winding 23 is close to zero. These transitions signal to the microprocessor that the supply voltage is zero and start an internal delay routine whose length is determined by the data from the bank of switches 14. When the delay is complete one of pins 9', 10' of the microprocessor is raised to a high voltage causing one of the amplifiers 19, 20 to conduct and cause one of the triacs 21, 22 to conduct and cause current to flow in one of the lamps 4 and 5. A second delay routine may then be commenced, determined by the bank of switches 14 data, to fix the other triac at the appropriate time. The microprocessor programme then waits until the next transition on pin 25' is received and then restarts the delay routines. By this means the single manual control 14 effects the proper control of the lamp intensities according to preprogrammed data stored in the microprocessor 18.

In operation a transparency 15 is placed in the negative holder and then the requisite switch in the bank of switches 14 is depressed so that the combined light produced comprises energy in both wavelength bands.

The enlarger aperture and time of exposure are then deduced either by eye or by electronic means and set so as to produce a correctly exposed print. A trial print is then produced using a sample of variable contrast paper and if this print has been satisfactorily exposed then the print is examined to determine if the contrast is correct. To produce a print of either lower or higher contrast the same paper is used, the same time of exposure is used and the same enlarger diaphragm setting is used, another switch in the bank of switches 14 is depressed to increase or decrease the intensity of magenta light according to whether the contrast of a subsequent print is to be increased or decreased. As the appropriate switch in the bank of switches 14 is selected and depressed to adjust the intensity of magenta light the intensity of yellow light changes also in substantially inverse manner.

I claim:

1. A lamphouse for use in the production of prints on variable contrast material the lamphouse comprising at least a first tungsten filament lamp from which light passes through a first colour-selective filter passing light in one of two mutually exclusive wavebands and at least a second tungsten filament lamp from which light passes through a second colour-selective filter passing light in the other of the two mutually exclusive wavebands, a diffusing screen placed to pass the filtered light out of the lamphouse and through a transparency which is to be printed there being connected between each said lamp and an alternating voltage source a bidirectional thyristor (triac), the phase angle of conduction of which is determined by a microprocessor according to data stored in a read-only memory, and single manual control means for selecting alternative addresses in the memory according to the contrast of print to be made, the data stored being chosen to cause the bidirectional thyristors to adjust the currents through said first and second lamps so that the energies of light in the two mutually exclusive wavebands vary substantially in inverse proportion as the chosen contrast of the print is varied and the total light intensity is controlled to suit the sensitivity of the material at different contrast grades to ensure equal exposure for each contrast grade.

2. A lamphouse according to claim 1 wherein the microprocessor is used to determine the phase angle of conduction by counting internally generated pulses as determined by the data in the read-only memory, starting at a time related to the instant when the mains voltage becomes zero, and on completion of the count energising one or more of the microprocessor output terminals so as to cause the triac to be brought into conduction.

\* \* \* \* \*